(12) United States Patent
Huff

(10) Patent No.: US 9,475,394 B2
(45) Date of Patent: *Oct. 25, 2016

(54) COMPRESSED AIR ENGINE

(71) Applicant: HB Spider LLC, Reeds, MO (US)

(72) Inventor: Christopher M. Huff, Reeds, MO (US)

(73) Assignee: HB Spider LLC, Reeds, MO (US)

( * ) Notice: Subject to any disclaimer, the term of this patent is extended or adjusted under 35 U.S.C. 154(b) by 327 days.

This patent is subject to a terminal disclaimer.

(21) Appl. No.: 14/160,266

(22) Filed: Jan. 21, 2014

(65) Prior Publication Data

US 2014/0130485 A1 May 15, 2014

Related U.S. Application Data

(63) Continuation-in-part of application No. 13/158,409, filed on Jun. 11, 2011, now Pat. No. 8,850,807, which is a continuation-in-part of application No. 12/817,122, filed on Jun. 16, 2010, now Pat. No. 8,667,787.

(51) Int. Cl.
*B60L 3/00* (2006.01)
*B60K 6/12* (2006.01)
*B60L 1/00* (2006.01)
*B60L 8/00* (2006.01)
*B60L 11/16* (2006.01)
(Continued)

(52) U.S. Cl.
CPC .............. *B60L 3/0061* (2013.01); *B60K 6/12* (2013.01); *B60L 1/003* (2013.01); *B60L 3/0023* (2013.01); *B60L 8/003* (2013.01); *B60L 11/16* (2013.01); *B60L 11/1805* (2013.01); *B60L 11/1868* (2013.01); *B60L 15/20* (2013.01); *B60K 2006/123* (2013.01); *B60K 2016/003* (2013.01); *B60L 2240/36* (2013.01); *B60L 2240/421* (2013.01); *B60L 2270/145* (2013.01); *B60Y 2400/15* (2013.01); *Y02T 10/6208* (2013.01); *Y02T 10/645* (2013.01); *Y02T 10/7005* (2013.01); *Y02T 10/7066* (2013.01); *Y02T 10/7083* (2013.01); *Y02T 10/72* (2013.01); *Y02T 10/7275* (2013.01)

(58) Field of Classification Search
CPC ........................... B60K 6/12; B60K 2006/123
USPC ........................................ 60/407, 409, 410
See application file for complete search history.

(56) References Cited

U.S. PATENT DOCUMENTS 3,765,180 A 10/1973 Brown
3,925,984 A 12/1975 Holleyman
(Continued)

OTHER PUBLICATIONS

Wikipedia.com article "Compressed-air engine", http://en.wikipedia.org/wiki/Compressed-air_engine, downloaded Jun. 16, 2010.

(Continued)

*Primary Examiner* — Thomas E Lazo
(74) *Attorney, Agent, or Firm* — Martin & Associates, LLC; Derek P. Martin

(57) ABSTRACT

An air engine system includes an electric motor coupled to the drive shaft of an air engine to control the speed of the air engine. An accelerator controls the speed of the electric motor, which in turn controls the speed of the air engine. The air engine uses compressed air from a compressed air source provided by an air compressor. The air engine may be used on a vehicle, providing a clean environmentally-friendly means of locomotion.

20 Claims, 12 Drawing Sheets

(51) Int. Cl.
*B60L 11/18* (2006.01)
*B60L 15/20* (2006.01)
*B60K 16/00* (2006.01)

(56) References Cited

U.S. PATENT DOCUMENTS

| | | | |
|---|---|---|---|
| 4,018,050 A * | 4/1977 | Murphy | F01B 1/02 |
| | | | 60/370 |
| 4,124,978 A | 11/1978 | Wagner | |
| 4,292,804 A | 10/1981 | Rogers, Sr. | |
| 4,309,620 A | 1/1982 | Bock | |
| 4,311,917 A | 1/1982 | Hencey, Jr. et al. | |
| 4,596,119 A | 6/1986 | Johnson | |
| 5,309,713 A | 5/1994 | Vassallo | |
| 5,415,245 A | 5/1995 | Hammond | |
| 5,491,977 A | 2/1996 | Cho et al. | |
| 5,515,675 A | 5/1996 | Bindschatel | |
| 5,695,430 A | 12/1997 | Moyer | |
| 5,725,062 A | 3/1998 | Fronek | |
| 6,006,519 A | 12/1999 | Hormell, Jr. | |
| 6,327,858 B1 | 12/2001 | Negre et al. | |
| 7,254,943 B2 | 8/2007 | Moller | |
| 7,315,089 B2 | 1/2008 | Lambertson | |
| 7,828,091 B2 | 11/2010 | Wedderburn et al. | |
| 8,850,807 B2 * | 10/2014 | Huff | B60K 3/02 |
| | | | 60/409 |
| 2007/0005222 A1 | 1/2007 | Lepley et al. | |
| 2009/0266069 A1 | 10/2009 | Domes | |
| 2010/0296949 A1 | 11/2010 | Corley | |

OTHER PUBLICATIONS

HowStuffWorks.com article "How the Air Car Works", http://auto.howstuffworks.com/fuel-efficiency/vehicles/air-car.htm/printable, printed Jun. 16, 2010.

Greencar.com article "Trends: Air Powered Cars", http://www.greencar.com/articles/trends-air-powered-cars.php, printed Jun. 16, 2010.

* cited by examiner

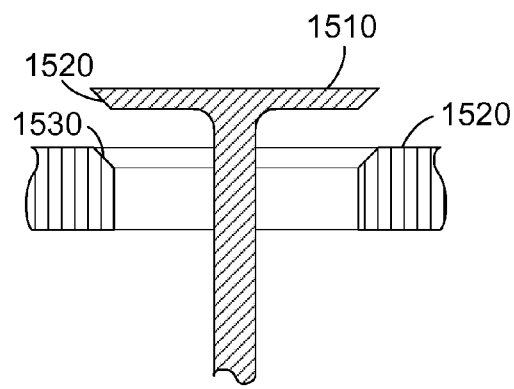
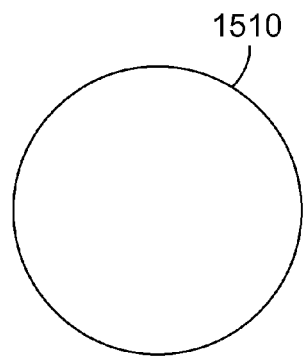
FIG. 15  Prior Art     FIG. 16  Prior Art
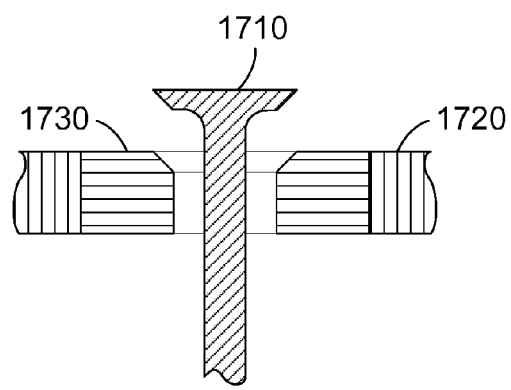
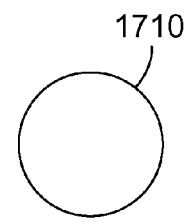
FIG. 17                FIG. 18
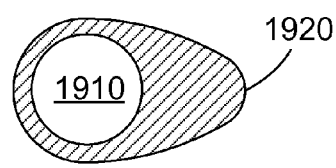
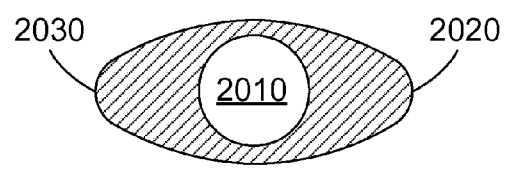
FIG. 19  Prior Art     FIG. 20

COMPRESSED AIR ENGINE

CROSS-REFERENCE TO PARENT APPLICATIONS

This patent application is a continuation-in-part of U.S. Ser. No. 13/158,409 filed on Jun. 11, 2011, which is a continuation-in-part of U.S. Ser. No. 12/817,122 filed on Jun. 16, 2010. Both of these related applications are incorporated herein by reference.

BACKGROUND

1. Technical Field

This disclosure generally relates to engines, and more specifically relates to compressed air engines.

2. Background Art

Engines that run off compressed air (air engines) have been around for more than a century. While some have been used is specialized applications, various technical challenges have prevented their widespread use in a variety of different applications. One such challenge is controlling the speed of an air engine. Many schemes have been proposed to control the speed of an air engine. Most vary the air flow and air pressure input to the engine to vary the speed of the engine. Some of these schemes require two different stages of air compression and accelerator valves that increase the complexity and cost of the system.

BRIEF SUMMARY

An air engine system includes an electric motor coupled to the drive shaft of an air engine to control the speed of the air engine. An accelerator controls the speed of the electric motor, which in turn controls the speed of the air engine. The air engine uses compressed air from a compressed air source provided by an air compressor. The air engine may be used on a vehicle, providing a clean environmentally-friendly means of locomotion.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 15 is a side cross-sectional view of a prior art intake valve on an internal combustion engine;

FIG. 16 is a top view of the prior art intake valve shown in FIG. 15;

FIG. 17 is a side cross-sectional view of an intake valve in accordance with the disclosure and claims herein;

FIG. 18 is a top view of the intake valve shown in FIG. 17;

FIG. 19 is a cross-sectional view showing one lobe on a prior art cam shaft; and FIG. 20 is a cross-sectional view showing dual lobes on a cam shaft.

DETAILED DESCRIPTION

An air engine system includes a motor coupled to the drive shaft of an air engine to control the speed of the air engine. The air engine uses compressed air from a compressed air source provided by an air compressor. The speed of the motor is controlled by an accelerator input to a speed controller. The speed of the motor determines the speed of the air engine. The air engine may be used on a vehicle, providing a clean environmentally-friendly means of locomotion. The air engine may also be used in a variety of other applications, including power generation.

Figure 1:
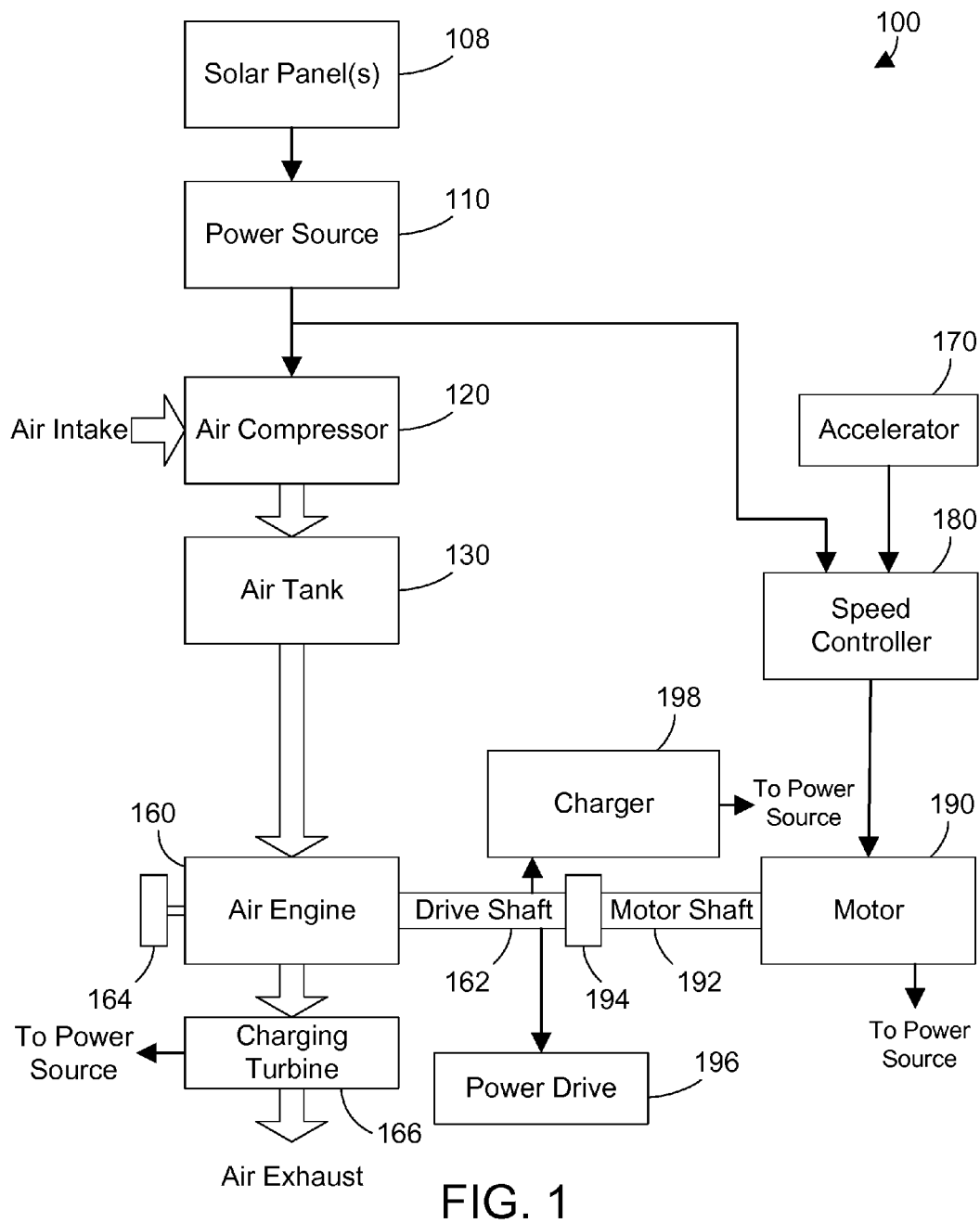
FIG. 1 is a block diagram of an air engine system.

Referring to FIG. 1, an air engine system 100 includes a power source 110 that powers an air compressor 120. The power source 110 is preferably a direct current (DC) power source that is provided by one or more batteries, such as deep-cycle vehicle batteries. The air compressor 120 receives air at its intake and outputs compressed air at its output to an air tank 130. The air tank 130 is a storage receptacle for the compressed air provided by the air compressor 120. Note the air tank 130 may be optional in some applications when the air compressor 120 is capable of delivering the required volume of air at the desired pressure without an air tank. Air from the air tank 130 or directly from the air compressor 120 is provided to an intake of an air engine 160. The air engine 160 receives the compressed air input at the intakes on the heads, and uses the compressed air to convert the energy in the compressed air to drive a drive shaft 162. Because there is no combustion in the air engine 160, the exhaust from the air engine is air that may be exhausted to ambient with zero hydrocarbon emissions, or which may be recycled by being fed back to the air intake of the air compressor 120.

In one specific implementation discussed in detail herein, the air engine uses heads similar to conventional heads as a timing mechanism to provide air input and air exhaust using valves driven by a cam shaft. The intake valves in the heads provide compressed air to the cylinders into the air engine 160 at the appropriate points in time to provide power strokes to the air engine 160, while the exhaust valves in the heads exhaust the air.

The air engine 160 drives a drive shaft 162. The drive shaft 162 provides power drive 196 to provide mechanical work. If the air engine system 100 is used in a vehicle, the power drive 196 would typically include a transmission and differential that provides power to two or more of the wheels of the vehicle.

The drive shaft 162 of the air engine 160 is coupled to a motor shaft 192 of an electric motor 190 using a suitable coupler 194. The electric motor 190 is preferably a direct current (DC) motor. The coupler 194 could be a rigid coupler or could be a flexible coupler, such as a universal joint. In one specific implementation, the air engine 160 and motor 190 are positioned so the drive shaft 162 and motor shaft 192 are aligned along their longitudinal axes so they can be directly coupled with coupler 194. In an alternative implementation, the coupler 194 could be a gear, pulley or sprocket on the drive shaft 162 that is coupled to a corresponding gear, pulley or sprocket on the motor shaft 192 of motor 190, such as with a belt or chain. In addition, the coupler 194 could include suitable means for increasing or reducing the rotational speed of the drive shaft and/or motor shaft, such as a gearbox or different sized pulleys. The coupler 194 extends to any suitable way to mechanically couple the drive shaft 162 to the motor shaft 192 such that the speed of the motor shaft 192 controls the speed of the drive shaft 162.

The motor 190 is driven by a speed controller 180 coupled to an accelerator 170. The speed controller 180 sets the speed of the motor 190 according to the state of the accelerator 170. The accelerator 170 allows an operator of the air engine system 100 to increase or decrease the speed of the air engine 160 by changing the state of the accelerator 170, which causes the speed controller 180 to drive the motor 190 to a desired speed. In one suitable implementation, the accelerator 170 is a variable resistor, and speed controller 180 drives the motor 190 with a speed that corresponds to the resistance of the variable resistor. The accelerator 170 and speed controller 180 extend to any suitable way to determine the speed of the motor 190.

The air engine system 100 may include optional components, which include one or more solar panels 108, a flywheel 164, a charger 198, and a charging turbine 166. The solar panel(s) 108 are used to charge the power source 110. The flywheel 164 is used to store energy from the engine so the engine can maintain its speed over varying loads. The charger 198 is powered by the drive shaft 162 to charge the power source 110. The charging turbine 166 is placed in the path of the air exhaust from the air engine 160, and converts the energy from the exhaust exiting the air engine into rotational energy that is converted to electricity to charge the power source 110. The solar panel(s) 108 and air turbine 166 will extend the operating time of the air engine system 100 by providing additional energy to the power source 110.

Figure 2:
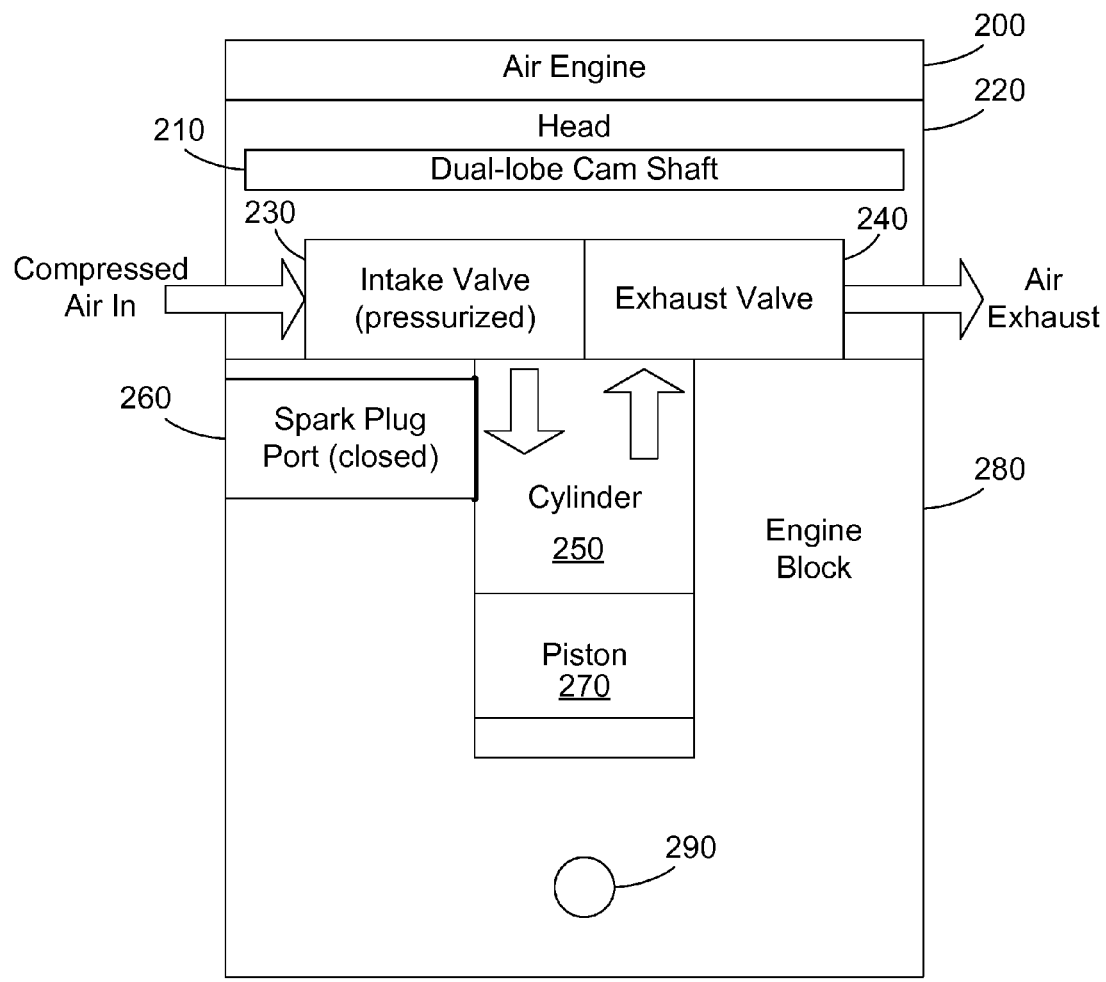
FIG. 2 is a block diagram of a specific implementation of the air engine in FIG. 1.

One suitable implementation for the air engine 160 in FIG. 1 is shown as air engine 200 in FIG. 2. The air engine 200 includes an engine block 280 that includes a plurality of pistons in a plurality of cylinders that provide power to a drive shaft 290. For the sake of illustration, only one cylinder, piston, intake valve and exhaust valve are shown in FIG. 2. One skilled in the art will realize there is a set of these items for each cylinder in the air engine. The drive shaft 290 is preferably a crank shaft driven by connecting rods connected to the pistons. The details of the connecting rods and crank shaft are not shown in FIG. 2 because these are well-known to one of ordinary skill in the art. One or more heads 220 are attached to the engine block. Each head 220 includes an intake valve 230 for each cylinder 250, a corresponding exhaust valve 240 for each cylinder 250, and a dual-lobe cam shaft 210 that opens the intake valves 230 and exhaust valves 240 at appropriate times. A four cylinder engine could have a single head, while a six or eight cylinder engine could have two heads, as is known in the art.

In air engine 200, the intake portion of head 220 is pressurized with the compressed air input. This can be done, for example, by replacing the intake manifold with one or more metal plates that include one or more air fittings connected to the compressed air output of the air compressor to pressurize the intake for each intake valve. The intake valve 230 in the head 220 is opened under control of a dual-lobe cam shaft 210. The combination of the head 220 and the dual-lobe cam shaft 210 make up a timing mechanism that controls when compressed air is input into each cylinder and exhausted from each cylinder. The spark plug port 260 is closed. One suitable way to plug the spark plug port is to leave a spark plug in place unconnected to any ignition wire. Another suitable way is to use a plug with the same threads as on a spark plug. The piston 270 has a power stroke (i.e., is pushed down) when the intake valve opens, which causes the compressed air to provide a motive force that pushes the piston down in the cylinder.

In a traditional internal combustion engine, a piston in a cylinder travels up and down twice for each power cycle. With the piston in an upper position, the intake valve is opened as the piston moves downward while an air/fuel mixture is either drawn into the cylinder in a carbureted engine or while the air/fuel mixture is injected into the intake in a fuel injected engine. This is the intake stroke. The piston reaches the bottom of its intake stroke, the intake valve closes, and the piston moves upward, compressing the fuel-air mixture in the cylinder. This is the compression stroke. A spark from the spark plug then causes the fuel/air mixture to combust, driving the piston downward from the force of the combustion. This is the power stroke. The piston then moves upward while the exhaust valve is open, pushing the combusted gasses out of the cylinder through the exhaust valve. This is the exhaust stroke. The piston thus travels four strokes to yield one power stroke.

One of the significant advantages in using compressed air as the motive force in an internal combustion engine is there is no combustion, and therefore no need to have a separate compression stroke and combustion stroke. Thus, in the air engine 200 shown in FIG. 2, the head under control of the dual-lobe cam shaft 210 opens the intake valve when the piston is near to top of the cylinder, which causes the compressed air to be forced into the cylinder, creating a power stroke that pushes the piston down. On the next stroke up, the exhaust valve 240 is opened to exhaust the air in the cylinder. The piston thus travels two strokes to yield a power stroke instead of four. Because the compression and combustion strokes have been eliminated in an air engine, an internal combustion engine that has been retrofitted to run on air can produce significantly more power than when the internal combustion engine ran on fuel because there is a power stroke on each cycle of the piston. Note, however, this requires a dual-lobe cam shaft 210 as shown in FIG. 2. The dual-lobe cam shaft 210 includes the lobes on a standard cam shaft, and additionally includes lobes directly opposite (i.e., 180 degrees opposite) each lobe. The dual-lobe cam shaft 210 thus allows a traditional head to produce twice as many power strokes when operating on compressed air when compared to burning fuel. The dual-lobe cam shaft 210 and head 220 comprise a timing mechanism that controls the injection and exhaust of air into and out of the cylinders in the air engine, thereby producing power in the air engine. The crank shaft 290 as is common in internal combustion engines is used to provide rotational power to a desired load, such as drive shaft 162 shown in FIG. 1.

Figure 3:
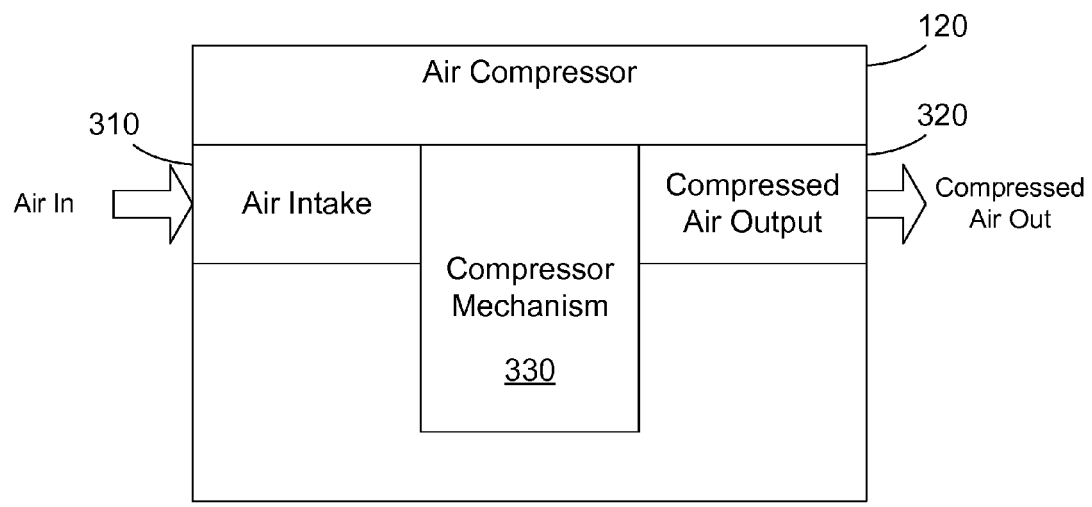
FIG. 3 is block diagram of one specific implementation of the air compressor in FIG. 1.

One suitable implementation of the air compressor 120 in FIG. 1 is shown in FIG. 3. Air compressor 120 includes an air intake 310 that receives air from an air source, which can be ambient or can be compressed air, as discussed in more detail below. The air input at the air intake 310 is directed to a compressor mechanism 330 that outputs the compressed air to its compressed air output 320, which is coupled to the air tank 190 or directly to the air intake of the air engine 160. In one suitable implementation as shown in FIG. 1, the compressor mechanism 330 is an electrical air compression mechanism run by a DC power source, such as power source 110 shown in FIG. 1. In an alternative implementation, the compressor mechanism 330 is a mechanical air compression mechanism run by a shaft that is rotated by the air engine 160 or by motor 190, and can be coupled to the drive shaft 162 or the motor shaft 192 using any suitable mechanism, including a coupler, a U-joint, a gearbox, pulleys and belts, sprockets and chains, etc.

Figures 4, 5:
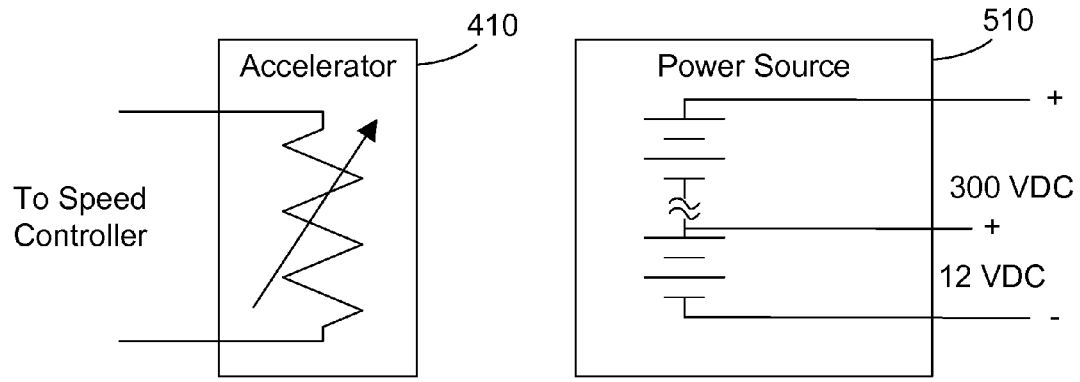
FIG. 4 is a block diagram of one specific implementation for the accelerator in FIG. 1.
FIG. 5 is a block diagram of one specific implementation for the power source in FIG. 1.

One suitable implementation for the accelerator 170 in FIG. 1 is shown in FIG. 4. The accelerator 410 is a suitable variable resistor (or rheostat) coupled to the speed controller. The speed controller in this implementation varies the speed of the motor 190 according to the resistance of the accelerator 410. When the air engine system 100 is used in a vehicle, the accelerator 170 is preferably a variable resistor with a linear plunger that allows a foot pedal to be coupled to the linear plunger such that when the driver of the vehicle presses the pedal, the resistance changes to increase the speed of the motor, and when the driver of the vehicle takes the foot off the pedal, a spring returns the linear plunger to its undepressed position, which corresponds to a resistance that causes the motor to run the air engine at an idle speed. In this manner, a linear variable resistor can function in similar fashion to known accelerator pedals in known vehicles.

Figure 14:
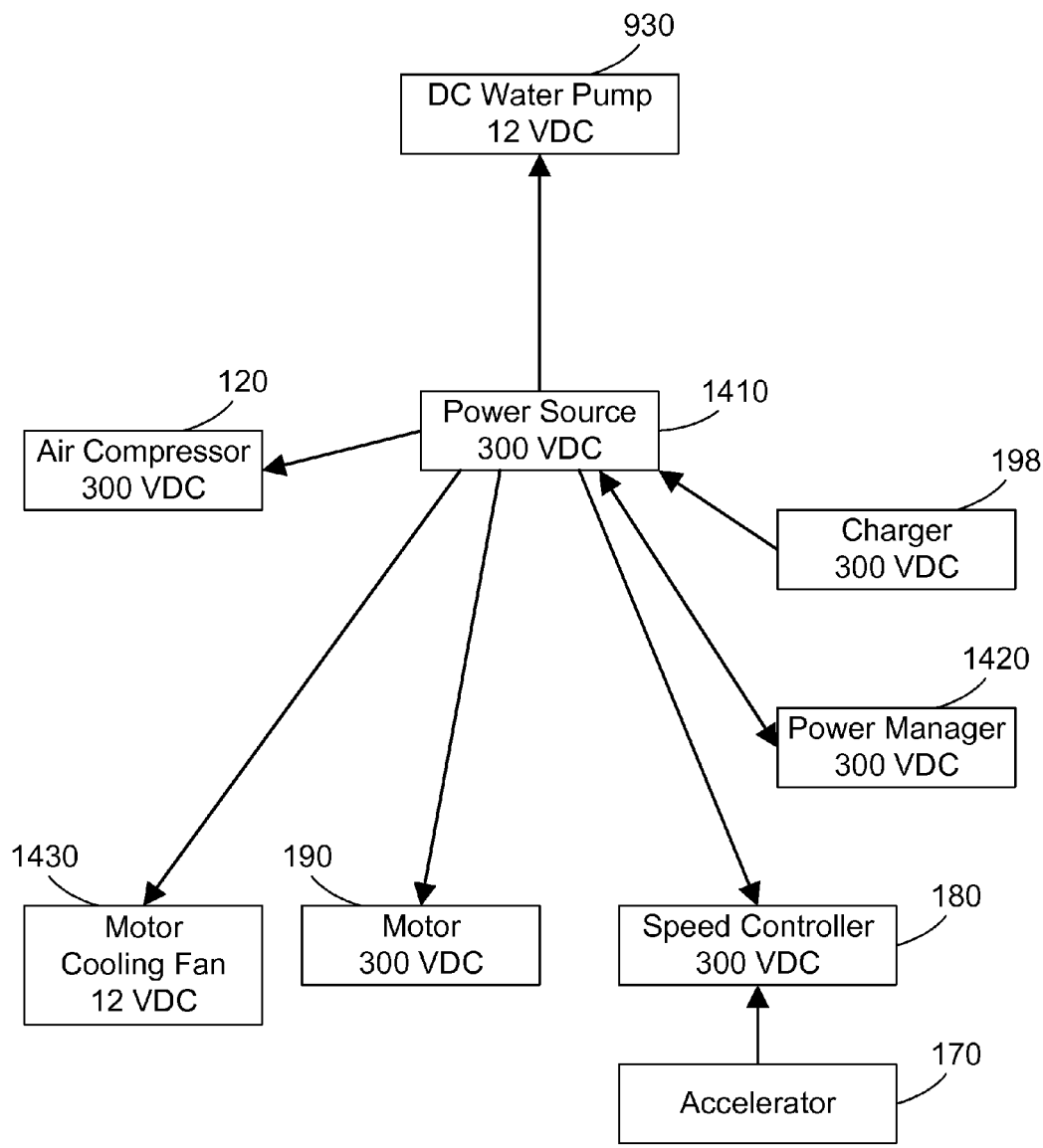
FIG. 14 is a block diagram of the electrical system for the air engine made by retrofitting an existing internal combustion engine in a vehicle.

One suitable implementation for the power source 110 in FIG. 1 is a DC power source made from appropriately connecting batteries, as shown in FIG. 5. In the specific implementation shown in FIG. 5, a total of twenty-five 12 volt deep-cycle batteries are connected in series to produce a 300 VDC output. The power source 510 also includes a 12 VDC output to provide power to a DC water pump and DC cooling fan, as shown in FIG. 14 and described in more detail below.

Figure 6:
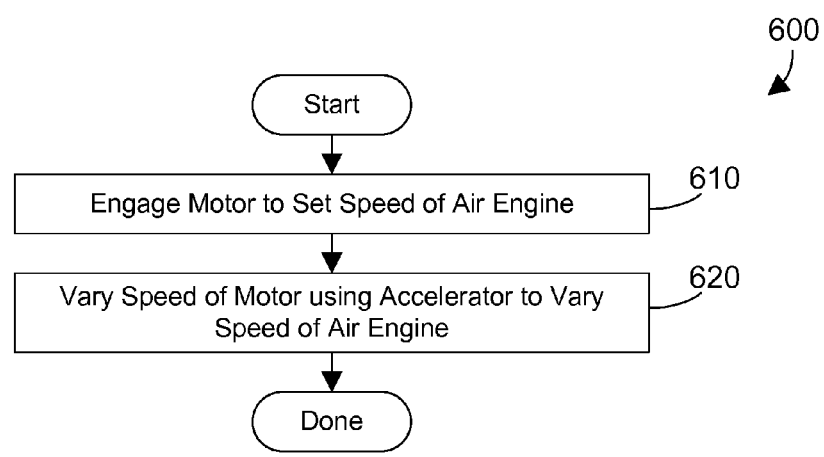
FIG. 6 is a flow diagram of a method for operating the air engine system in FIG. 1.

Referring to FIG. 6, a method 600 for operating the air engine begins by engaging the motor to set the speed of the air engine (step 610). The rotation of the air engine causes the heads and dual-lobe cam shaft (see FIG. 2) to serve as a timing mechanism that causes the air engine 160 to run at the speed determined by the motor. The speed of the motor may then be varied using the accelerator to vary the speed of the air engine (step 620).

Known air engines use complex means to control the speed of the air engine, including multiple stages of compression and means such as accelerator valves for varying the air input to the engine. Varying air pressure and air flow to an air engine to control the speed of the air engine requires sophisticated and complex controls that add to the complexity and cost of an air engine. The air engine system 100 disclosed and claimed herein avoids complex means to control of the speed of the air engine by supplying a motor external to the air engine to set the speed of the air engine. Once the motor determines the speed of the air engine, the air can provide the power stroke to the air engine at that speed without trying to vary the flow of the air into the engine to vary its speed. The result is the motor turns without taking a substantial amount of power from the power source because most of the power is supplied by the air engine. The combination of the air engine to supply the power and the motor to easily set the speed of the air engine results in an air engine system that allows easily varying the speed of the air engine using an accelerator that controls the speed of the motor coupled to the air engine. The motor has good low-end torque but has significantly less torque at higher speeds. The air engine, in contrast, has poor low-end torque but provides significant torque at higher speeds. Thus, using the motor to start the air engine and to control the speed of the air engine allows the motor to control the speed of the air engine at lower speeds while allowing the air engine to provide a majority of the work at normal operating speeds. Note also the motor acts as a starter for the air engine, eliminating the need for using a traditional starter.

The air engine system disclosed and claimed herein can be used to power vehicles. The result will be a vehicle that can run for a fraction of the energy cost of internal combustion engines, while burning no fossil fuel. The resultant air engine system thus provides an environmentally-friendly way to provide significant energy savings for operating a vehicle.

A conventional internal combustion engine in a vehicle may be retrofitted to run as an air engine as disclosed and claimed herein. A 1994 ½ ton Chevrolet 2-wheel drive pickup truck with a 350 cc engine and a 700R automatic transmission has been retrofitted to run on compressed air. FIGS. 7-11 show many of the details of how this vehicle was retrofitted to run on compressed air.

Figure 7:
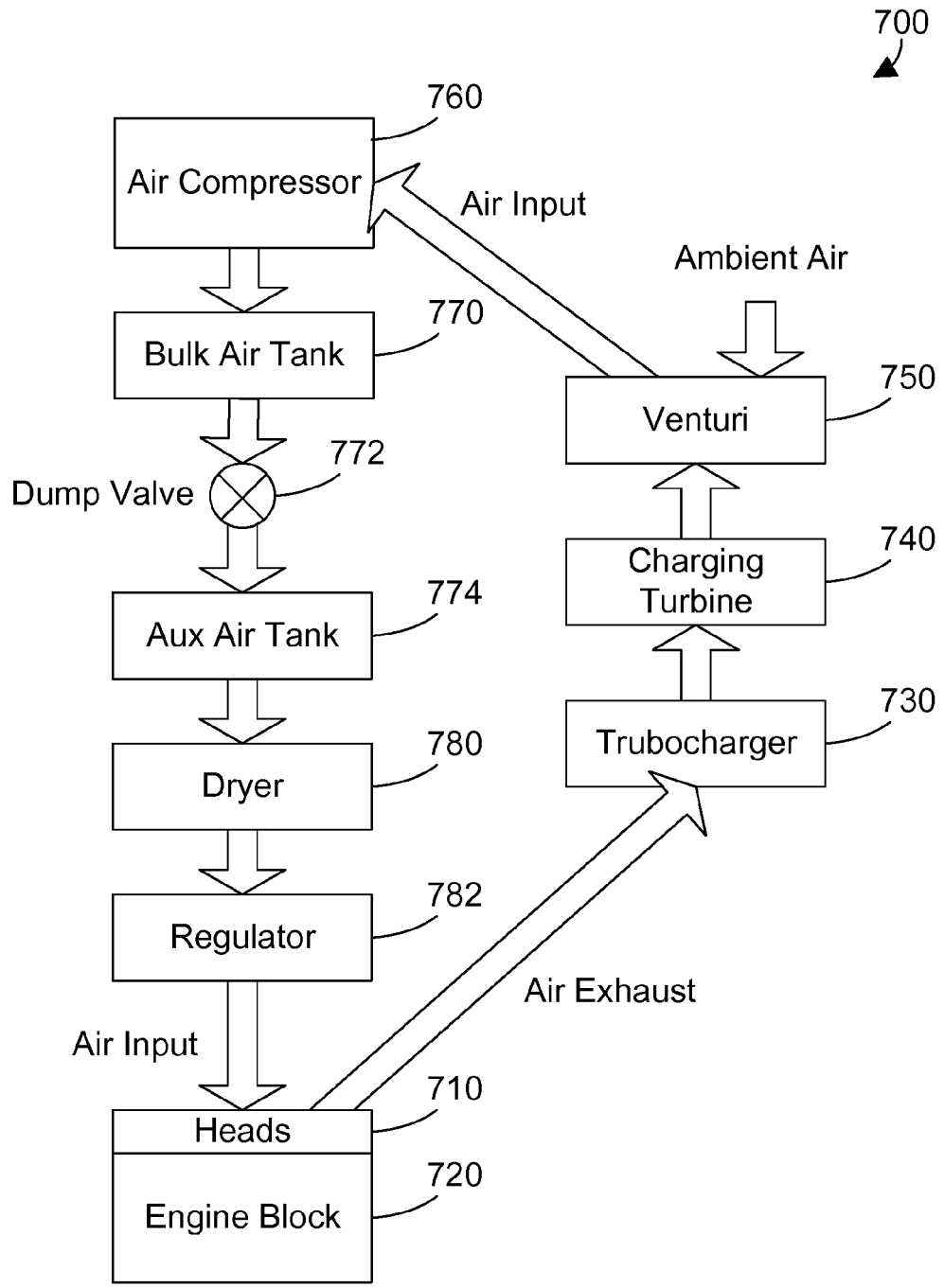
FIG. 7 is an air flow diagram of an air engine for a vehicle.

FIG. 7 shows the air flow system 700 for the retrofitted Chevrolet pickup. The air compressor 760 receives air input from a venturi 750. Air compressor 760 is one suitable example for air compressor 120 in FIG. 1. The air compressor 760 is an Airbase Industries compressor model number 42-56 that has a capacity of 43 cubic feet per minute (CFM) at 175 pounds per square inch (PSI), and runs on 96 volts direct current (DC). The air from the air input is compressed by the air compressor 760 into a bulk air tank 770. The air compressor 760 and bulk air tank 770 were placed in the bed of the pickup. An auxiliary air tank 774 was put under the hood in the engine compartment. A line was run from the bulk air tank 770 to a dump valve 772 in the cab to the auxiliary air tank 774. The dump valve 772 allows depressurizing the air tanks 770 and 774. While the prototype was built with a manual dump valve, the dump valve 772 shown in FIG. 7 could be either manual or automatic. For example, the dump valve 772 could be an automatic over-pressure valve that would automatically dump air from the air tanks 770 and 774 if the pressure gets above some specified threshold. Note the combination of air tanks 770 and 774 together are one specific implementation for air tank 130 in FIG. 1.

The auxiliary air tank 774 is connected to a dryer 780. The dryer 780 is a Parker Hannifin dryer, part number P3NRA98BNT, and keeps the air flowing to the air engine dry. The dryer 780 is connected to an air regulator 782 that can be set to any suitable pressure to assure the air engine only sees pressures up to the maximum pressure allowed by the regulator 782. Of course, the air regulator 782 may be optional in some configurations. For example, the air regulator 782 may not be needed when the pressure and flow can be adequately controlled in other ways, such as by air compressor 760. The air from the air regulator 782 is delivered to the intake manifold of the heads 710, thereby providing compressed air at the intake valves of the heads 710, which power the pistons in the engine block 720. The heads and dual-lobe cams (see FIG. 2) are the timing mechanism for introducing compressed air into the cylinders in the engine block 720, and for exhausting the air from the cylinders in the engine block 720. The air is exhausted out of the heads through the exhaust manifold to a turbocharger 730, the exhaust of which can turn a charging turbine 740, which is one specific implementation of the charging turbine 166 shown in FIG. 1. The air exits the charging turbine 740 to venturi 750 to the input of the air compressor 760. Note the venturi 750 serves two functions, to increase the volume of air by mixing ambient air into the air input of the air compressor, and additionally to provide a pressure relief should the pressure in the air input become too high. The air flow system 700 shown in FIG. 7 will function without the turbocharger 730, the charging turbine 740 and the venturi 750, but each of these optional components enhances the efficiency of the air engine.

One of the advantages of the system shown in FIG. 7 compared to the system shown in FIG. 1 is the air flows in a closed system. In FIG. 1, the air intake to the air compressor 120 could be from ambient, and the air exhaust from the air engine 160 through the turbine 166 could be to ambient. In air flow system 700 shown in FIG. 7, the air is recycled over and over again in closed system, which means the dryer 780 will not have to work as hard to keep the air dry compared to a system that is taking in large quantities of ambient air, which may include a significant amount of moisture. Because there is no combustion in the air engine, the air coming out of the air engine as air exhaust is not significantly different in quality than the air going into the air engine. Because the air exhaust does not contain hydrocarbon pollutants, as is the case with an internal combustion engine, the air exhaust can be directly recycled to the air input of the air compressor.

Figure 8:
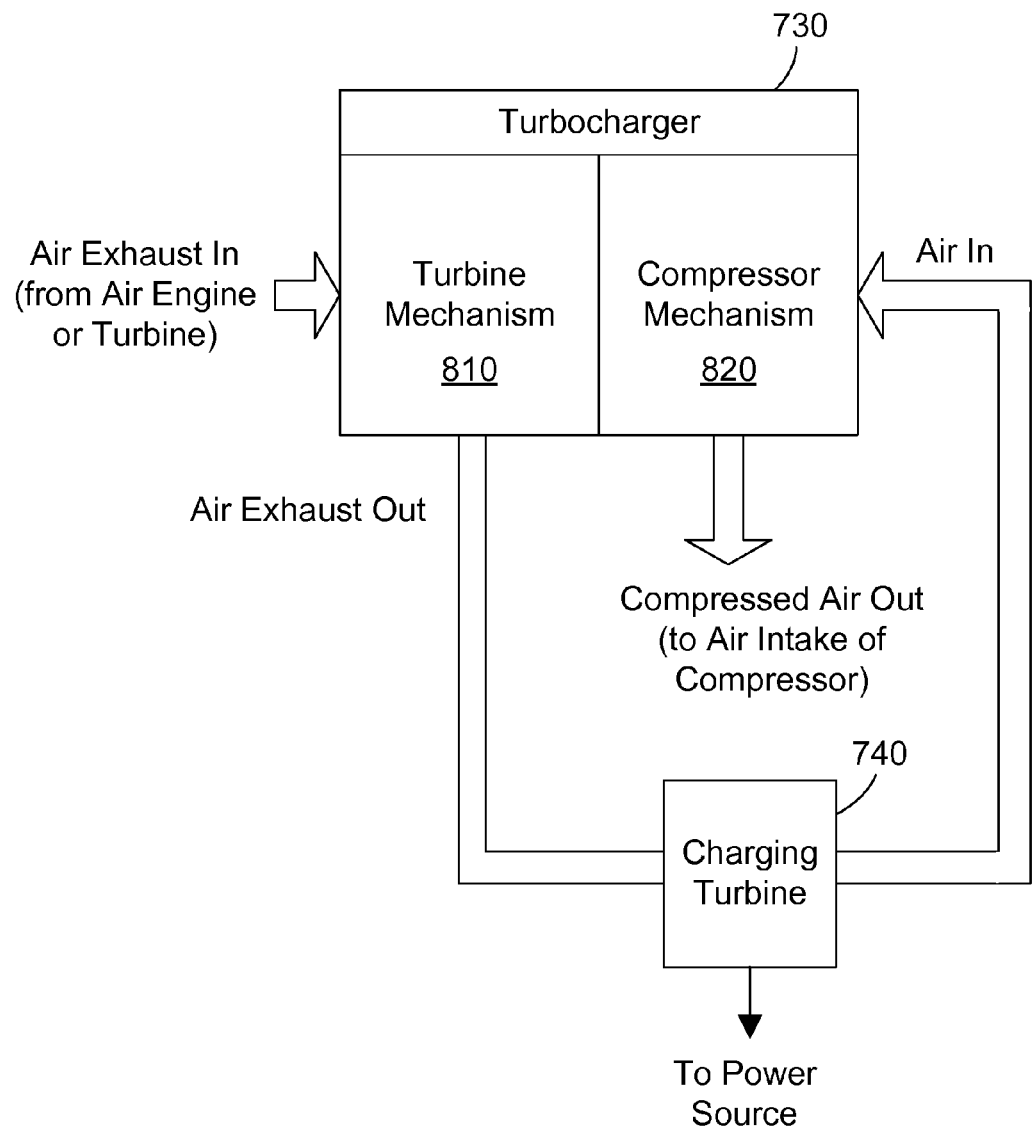
FIG. 8 is a block diagram of the turbocharger shown in FIG. 7.

Details of the turbocharger 730 in FIG. 7 are shown in FIG. 8. Turbocharger 730 includes a turbine mechanism 810 that is turned by air exhaust from the air engine, and a compressor mechanism 820 mechanically coupled to the turbine mechanism 810 that takes in the air exhaust from the turbine mechanism and provides a compressed air output to the air intake of the compressor. This is a very non-traditional use of a turbocharger. In a traditional turbocharger used on an internal combustion engine, the turbine mechanism is powered by exhaust, so the exhaust output of the turbine mechanism is exhausted to ambient and air input to the compressor mechanism is ambient air, which the compressor compresses, and this compressed air is provided to the intake of the engine. In the air engine application as shown in FIG. 7, the exhaust from the air engine is air, and can thus be fed back into the input of the compressor mechanism 820, which provides compressed air to the air intake of the air compressor. This allows for a system that is mostly closed as shown in FIG. 7. Because the turbocharger 730 is powered by the energy in the exhausted air, the compression of the air by the turbocharger 730 to the air intake of the compressor is done using energy that would otherwise be unused. Note the charging turbine 740 is shown in FIG. 8 between the air exhaust out and the air in on the turbocharger 730. In the alternative, the charging turbine 740 could be placed between the compressed air output of the compressor mechanism 820 and the venturi 750.

Figure 9:
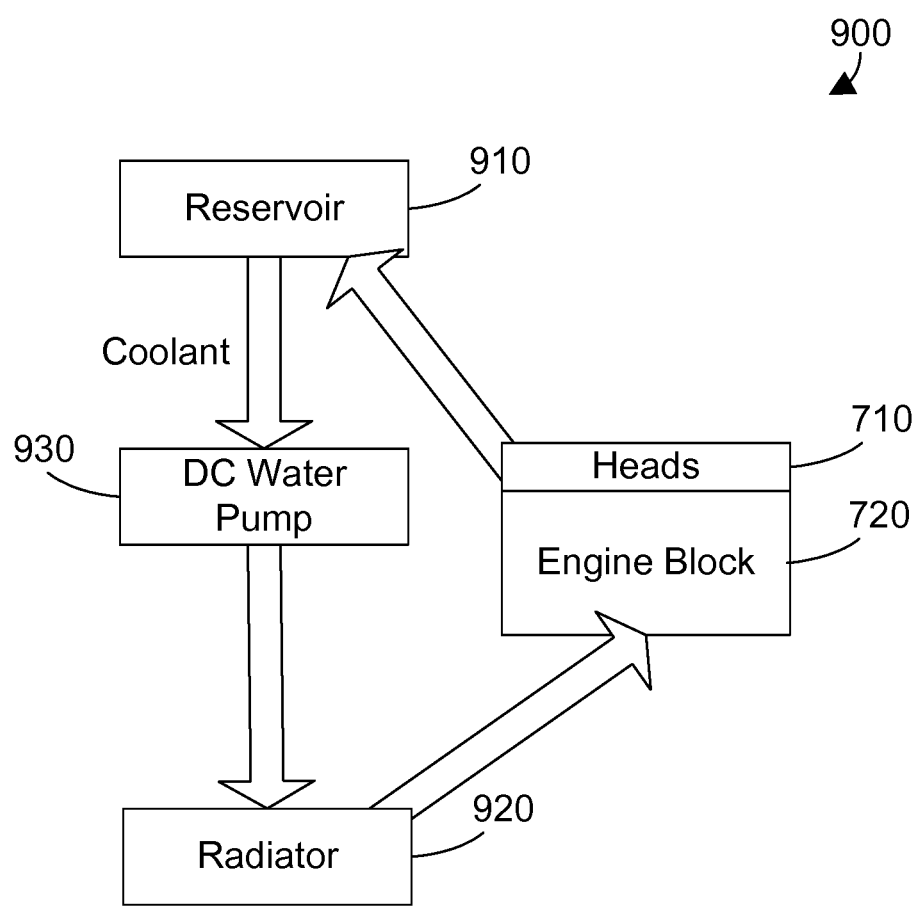
FIG. 9 is a coolant flow diagram of the air engine in FIG. 7.

FIG. 9 shows the coolant system 900 in the retrofit Chevrolet pickup. The traditional radiator is removed. The heat generated by the air engine is significantly less than the heat generated by the internal combustion engine, so the radiator requirements are significantly reduced. The large radiator for the internal combustion engine may thus be replaced by a much smaller radiator 920, such as one that is typically used to cool automatic transmission fluid. The overflow reservoir 910 for the internal combustion engine may then be used as the fill point for the coolant system 900. The reservoir 910 is connected to the DC water pump 930, which is in turn connected to the radiator 920. The DC water pump 930 draws coolant from the reservoir, and pumps coolant through the radiator 920 to the engine block 720. The coolant flows through the engine block 720 and through the heads 710 to the reservoir 910. One suitable DC water pump is a Summit Racing 12-0018 electric water pump that runs on 12 VDC, but there are many DC water pumps that are available and known to those skilled in the art. Note the terms water and coolant are used interchangeably herein, as one skilled in the art will recognize that water is a coolant and various combinations of water with other chemicals such as propylene glycol (anti-freeze) also makes a suitable coolant, and that water pumps in engines are made to pump any liquid that acts as a suitable coolant.

Figure 10:
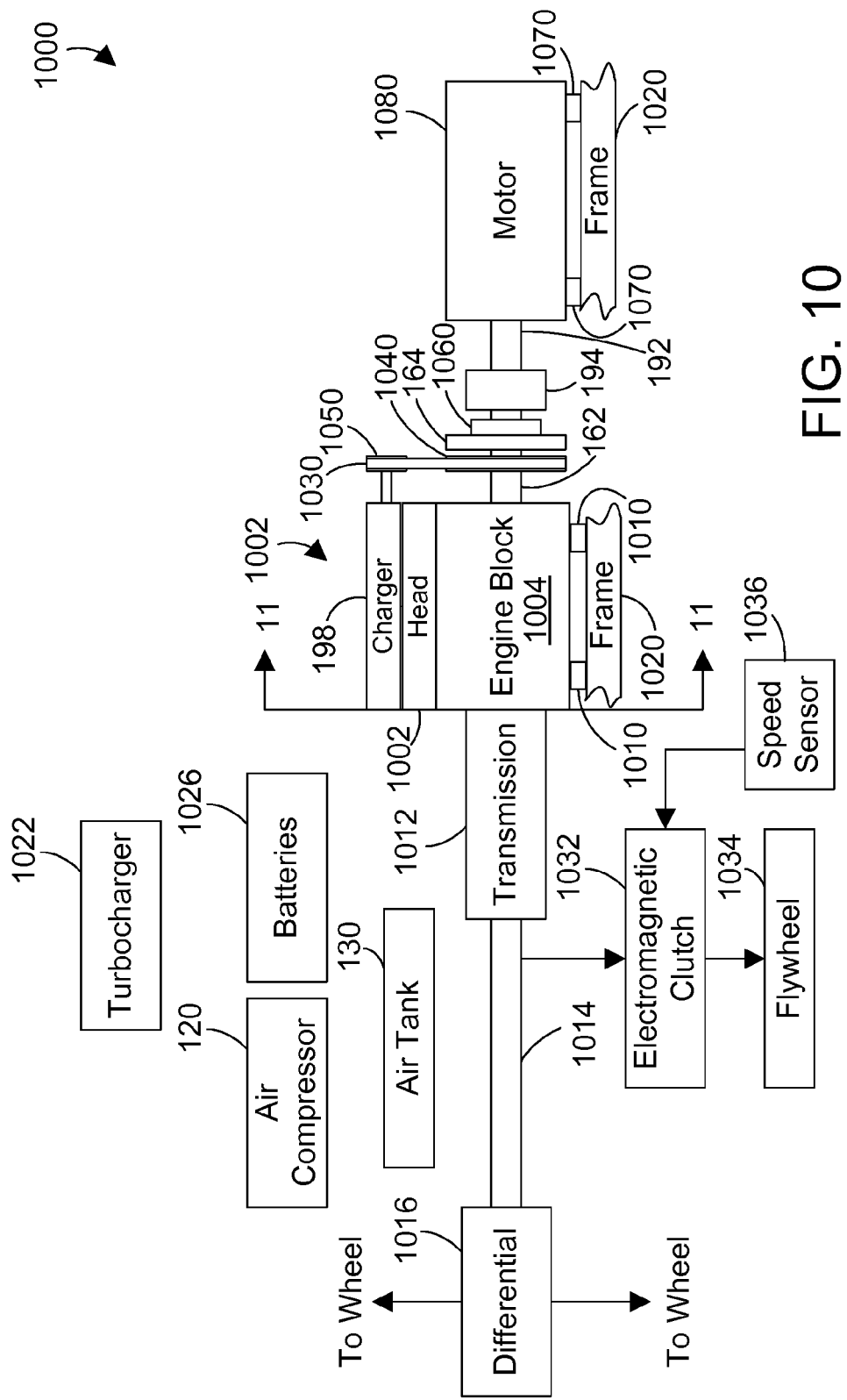
FIG. 10 is a block diagram showing a first suitable implementation for the air engine system shown in FIG. 1 made by retrofitting an existing internal combustion engine in a vehicle.

FIG. 10 shows a view of the arrangement of components that make up an air engine system 1000 in the Chevrolet retrofitted pickup. The traditional motor mounts for the internal combustion engine were replaced with rigid mounts 1010 to frame 1020. The rigid mounts are needed to secure the position of the air engine 1000 with respect to the motor 1080. Note that air engine 1002 is one suitable implementation for air engine 160 in FIG. 1, and motor 1080 is one suitable implementation for motor 190 in FIG. 1. The drive shaft 162 is shown in FIG. 10, which is the crankshaft for this particular engine. A pulley 1040 is connected to drive shaft 162. Pulley 1040 powers a corresponding pulley 1050 on charger 198 via a belt 1030. Belt 1030 may be a v-belt, a grooved belt, a notched belt, or any other suitable belt. While pulleys and a belt are shown in FIG. 10, any suitable method for powering the charger 198 by the air engine is within the scope of the disclosure and claims herein, including sprockets and a chain, a gearbox, etc.

A flywheel 164 is attached to the drive shaft 162. The flywheel can be any suitable size and weight. A smaller, lighter flywheel will store less energy than a larger, heavier flywheel, so the size and weight of the flywheel can be adjusted according to performance needs of the vehicle. The flywheel 164 can also serve as a harmonic balancer for air engine 1002. The drive shaft 162 is also connected to an electromagnetic clutch 1060. The electromagnetic clutch 1060 allows the coupling between the drive shaft and the motor to slip if needed. For example, if the vehicle is idling at a stoplight, and the driver then accelerates as the light turns green, a much smoother acceleration would be possible by varying the engagement of the electromagnetic clutch according to the position of the accelerator. Note the electromagnetic clutch 1060 shown in FIG. 10 is optional.

A coupler 194 provides a fixed coupling between the air engine and the motor shaft 192 of motor 1080 in the retrofitted Chevrolet pickup. A suitable hybrid type of coupler can be made by mating an EK2 Series 450 coupler and an EK6 Series 450 coupler made by R+W America L.P., 1120 Tower Lane, Bensenville, Ill. 60106. This hybrid coupler should provide the performance needed for the retrofitted vehicle. The motor 1080 in the retrofitted pickup is part number CMP2708X41-201400, available from Parker Hannifin, 6035 Parkland Blvd, Cleveland, Ohio 44124. The motor 1080 is a DC motor that is powered from the 300 VDC power source 510 shown in FIG. 5. The motor 1080 is preferably mounted to a bracket 1070 that is bolted to the frame 1020 near the location of the factory radiator, which was removed. This configuration shown in FIG. 10 allows the engine block 1004 and motor 1080 to be rigidly connected to the frame 1020 of the vehicle, allowing a rigid coupler 194 to be used. Due to the high torque produced by the motor 1080, using a rigid coupler is much simpler than using a flexible coupler and reduces vibration. Note the drive shaft 162 extends to the left side of the engine block 1004 to transmission 1012, which provides power to a drive shaft 1014 to a differential 1016 in the rear of the vehicle that powers the two rear wheels.

While the flywheel 164 is shown coupled to the drive shaft 162 of air engine 160, a flywheel can be located in a different location within the scope of the disclosure and claims herein. Thus, a separate electromagnetic clutch 1032 is shown in FIG. 10 that is driven by a speed sensor 1036 and which drives a flywheel 1034. Flywheel 1034 could be mounted horizontally under the bed of the pickup, or could be mounted in any other suitable location or orientation, such as vertically in the bed of the pickup. The disclosure and claims herein extend to any suitable size, location, orientation and configuration for a flywheel.

For the retrofitted Chevrolet pickup configuration shown in FIG. 10, the air compressor 120, batteries 1026 that make up the power source, and air tank 130 are preferably placed in the bed of the pickup. The turbocharger 1022 is also shown, which could be mounted under the hood, or could be mounted in the bed of the pickup. In a future implementation, all of these may be mounted under the bed of the pickup.

Figure 11:
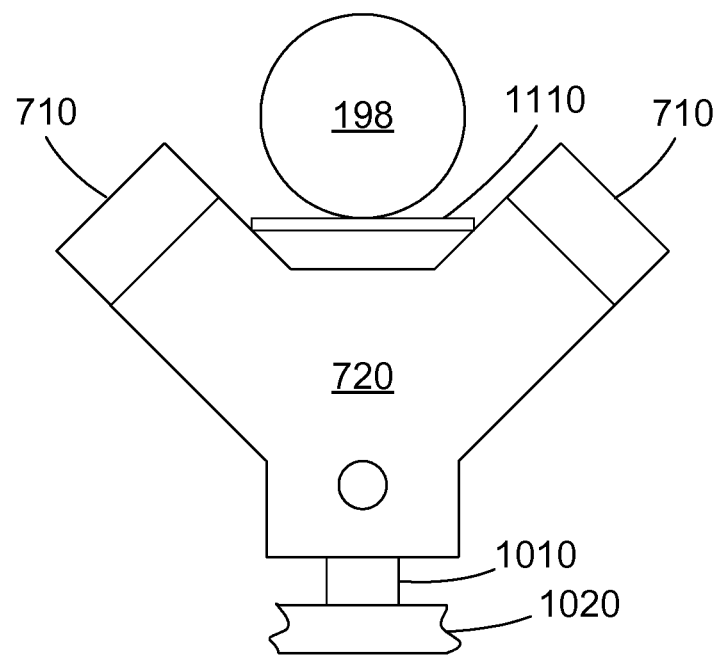
FIG. 11 is a cross-sectional view of the air engine system taken along the line 11-11 shown in FIG. 10.

FIG. 11 is a rear view of the air engine 160 in FIG. 1 taken along the line 11-11 in FIG. 10. The engine block 720 is a V-8 engine block, which means there are four cylinders in each of the legs of the V shown in FIG. 11. Each side has a corresponding head 710 that includes intake and exhaust valves as shown in FIG. 2. The charger 198 is preferably mounted to a bracket 1110, which is then bolted to the engine block 720.

The charger 198 is preferably an earth magnet charger that can provide at least 350 amps at 300 VDC. The exact size and shape of the charger can vary according to the desired voltage current, and according to the desired overall size of the charger. For example, Parker Hannifin can manufacture a charger that will satisfy the current and voltage specifications above in a package that is fifteen inches in diameter and four inches thick. Other configurations are possible by reducing the diameter of the charger and increasing its length. Thus, a preferable configuration would be a charger that is an elongated cylinder, which will allow the charger to fit more easily under the hood in the engine compartment.

Figure 12:
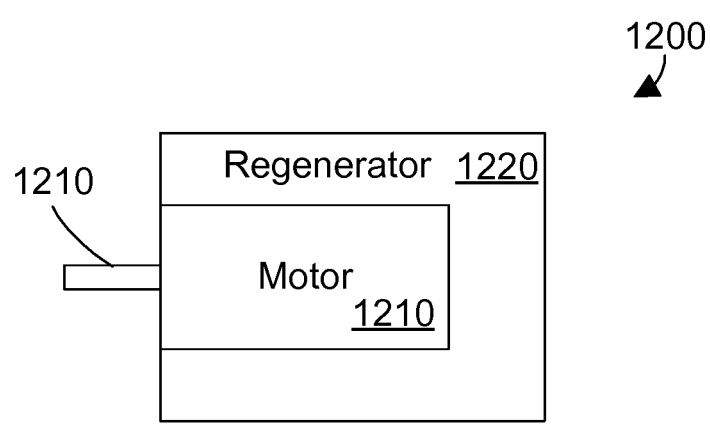
FIG. 12 is a block diagram of a motor that includes a regenerator.

The motor 1080 in FIGS. 10 and 190 in FIG. 1 could be a Parker Hannefin motor, part number MMP1426E41-KPSN, which is a 300 VDC motor. This motor is represented in FIG. 12 as motor 1200, and includes a motor portion 1210 and a regenerator portion 1220. The motor portion 1210 provides the drive needed by motor 190. The regenerator 1220 provides power generation when the motor 1200 is being run primarily by the air engine. Thus, when the air engine is initially started, the motor 1210 provides the power to get the air engine started and to bring the air engine to the desired operating speed. At that point, the air engine provides most of the motive power, which allows the regenerator 1220 to generate power from the air engine to charge the batteries in the power source. With such a motor, a separate charger such as charger 198 in FIGS. 10 and 11 may not be needed, because all of the charging of the power source could be done using the regenerator 1220. The regenerator 1220 shown in FIG. 12 is thus one specific implementation for charger 198 in FIGS. 1, 10 and 11. Note the regenerator 1220 also provides an auxiliary way to indirectly control speed of the motor 1200. Should the air engine try to exceed the speed set by the motor 1210, the regenerator 1220 could increase the power output to the batteries, which will provide an increased load on the air engine which will tend to keep the speed of the air engine in check.

Figure 13:
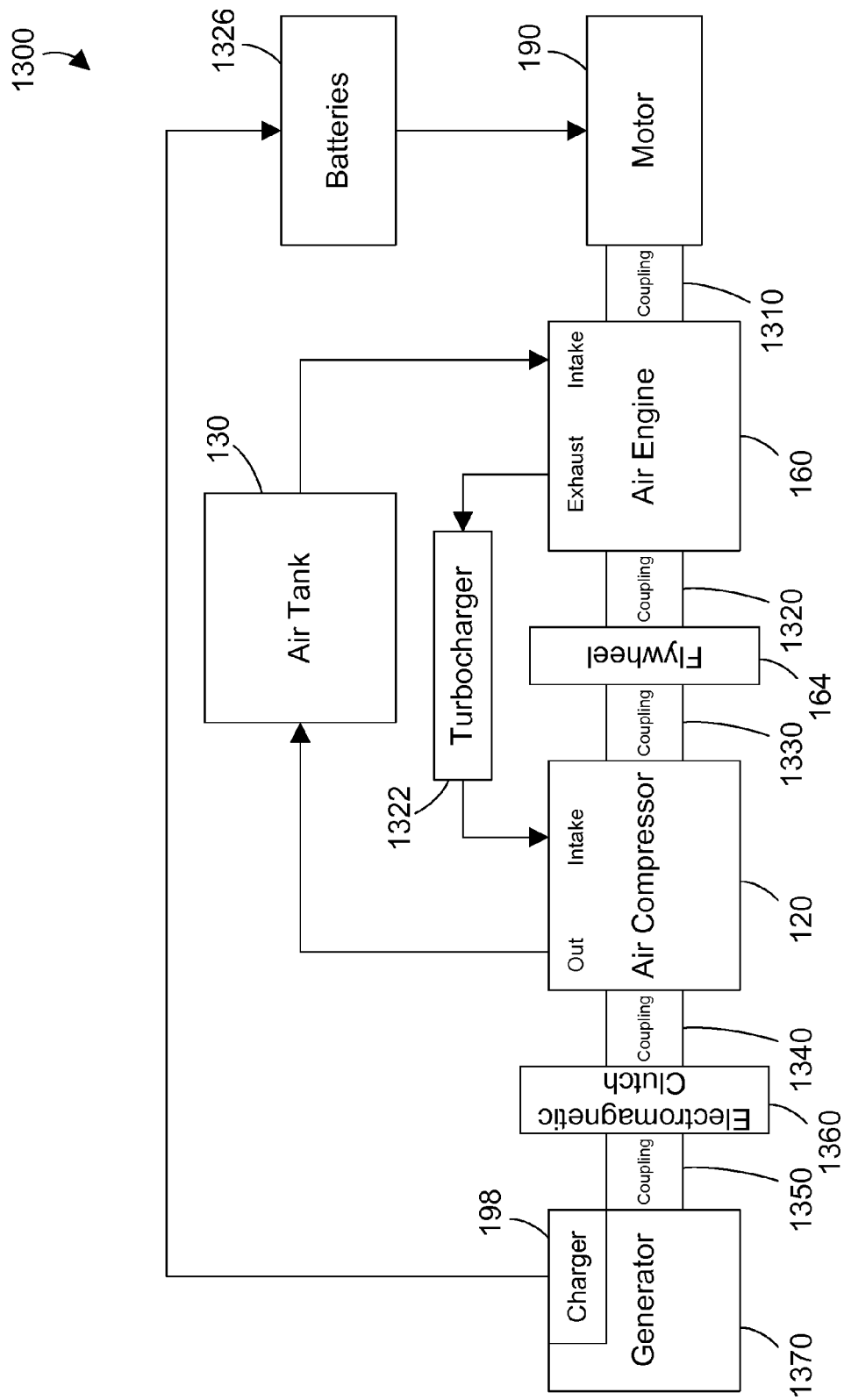
FIG. 13 is a block diagram showing a second suitable implementation for the air engine system shown in FIG. 1 for an electrical power generator.

FIG. 13 shows another specific configuration for an air engine system 1300 for a different application, namely for generation of electrical power. Air engine system 1300 includes a motor 190, air engine 160, a flywheel 164, an air compressor 120, an electromagnetic clutch 1360, and a generator 1370 which generates electrical power, such as alternating current (AC) power. The generator 1370 preferably includes a charger 198 that provides a charge at the appropriate voltage for the batteries 1326. Batteries 1326 could be twenty-five 12 volt batteries to produce a 300 VDC power source 510 as shown in FIG. 5. The batteries 1326 provide power to motor 190. The air intake of the air engine 160 is supplied from an air tank 130. The air exhaust of the air engine 160 turns a turbocharger 1322, which provides compressed air to the air intake of the air compressor 120. The compressed air at the output of the air compressor charges the air tank 130.

Note many of the various components shown in FIG. 13 are coupled together via couplings 1310, 1320, 1330, 1340 and 1350. The term "coupling" is used herein to be a very broad term that encompasses any suitable way to mechanically coupled two rotating components together. Each coupling 1310, 1320, 1330, 1340 and 1350 could be a direct coupling (rigid or flexible), or a coupling that increases or decreases speed of rotation (e.g., gears, gearbox, pulleys and belt, sprockets and chain, etc.)

The electromagnetic clutch 1360 is used to avoid loading the generator 1370 until the air engine 160 is rotating at a desired speed. This prevents the drag of the generator 1370 trying to supply power to an electrical load before the air engine 160 has achieved its desired operating speed. Once the air engine 160 is operating at its desired speed, the electromagnetic clutch 1360 will engage the generator, which will result in turning the generator to power some electrical load that is not shown in FIG. 13.

In one specific embodiment, the motor 190 and generator 1370 can be the same motor. For example, Parker motor part number MMP1426E41-KPSN is a 300 VDC motor that can be used as both the motor 190 and the generator 1370 in FIG. 13. Note this motor includes a motor portion 1210 and a regenerator portion 1220 as shown in FIG. 12 and discussed above.

FIG. 14 is a block diagram that shows the electrical system for the retrofitted Chevrolet pickup truck. A power source 1410 is one suitable example of power source 110 in FIG. 1. Power source 1410 is preferably 300 VDC, which is provided by twenty-five 12 VDC batteries connected in series. In the retrofitted Chevrolet pickup, the twenty-five batteries were installed in the bed. Because the twenty-five batteries are wired in series, the first tap in the twenty-five battery series may be used to power 12 VDC devices. The power source 1410 is connected to a power manager 1420 that is connected to each battery, monitors the state of each battery, and assures the batteries are charged but not over-charged. Power manager 1420 is desirable in the retrofit pickup truck because the motor 1080 and air compressor 120 run on 300 VDC, while other devices run off 12 VDC. The result is the batteries will have varying states of discharge depending on their position in the twenty-five battery series. Any suitable power manager may be used that can independently maintain charge on each of the twenty-five batteries. In the alternative, the power manager 1420 could be omitted altogether.

While the current prototype of the retrofitted Chevrolet pickup truck uses a 96 VDC air compressor specified above, any suitable air compressor operating on any suitable voltage could be used. In addition, a mechanical air compressor could be used that runs off out the drive shaft of the air engine. In the most preferred implementation, the air compressor will run at 300 VDC, as shown in FIG. 14. It is expected that one or more scroll-type air compressors can be used as air compressor 120. An advantage of scroll-type air compressors is multiple units can be stacked until the desired air flow is achieved.

The devices that run on 12 VCD include the DC water pump 930 and the motor cooling fan 1430. The air compressor 120 runs on 300 VDC. The speed controller 180 and motor 190 run on 300 VDC. The accelerator 1170 is provided with the motor 190, and connects to the speed controller 180 using a suitable cable and connector. For the retrofitted Chevrolet pickup, the speed controller is a Solitonl speed controller available from evnetics, LLC at 2047 4$^{th}$ Avenue South, Saint Petersburg, Fla. 33712.

When the engine in the Chevrolet pickup truck was retrofitted to run on air, it was discovered the stock intake valves were much larger than needed. Referring to FIGS. 15 and 16, a prior art intake valve 1510 is shown. FIG. 15 shows the cross-sectional view while FIG. 16 shows the top view. Intake valve 1510 includes a beveled edge 1520 that fits into a corresponding beveled surface 1530 in a portion of the head known as a valve seat 1520. When the cam shaft causes the intake valve to open as shown in FIG. 15 in a prior art internal combustion engine, a fuel-air mixture is allowed to pass from the intake manifold into the cylinder. With the head pressurized, a much smaller volume of compressed air is needed to produce a power stroke in the air engine. As a result, the intake valves were reworked as shown in FIGS. 17 and 18. The valve seat 1520 was milled to eliminate the beveled edge 1530 shown in FIG. 15. An insert 1730 was then press-fit into place with some adhesive. The insert 1730 provides a much smaller valve seat. The valve 1510 was ground to a smaller size as shown in FIGS. 17 and 18, to match the size of the valve seat in the insert 1730. The result is a much smaller intake valve that uses the air in the pressurized heads much more efficiently. Experimental tests show a net valve opening that is as little as five to fifteen percent the original valve opening suffices in delivering air to the air engine. Of course, the exact size of a valve will vary with changes in air pressure and with different engines. The principle here is pressurization of the heads makes a much smaller valve possible than in known internal combustion engines.

As discussed above with reference to FIG. 2, a dual-lobe cam shaft 210 is preferred, because it produces twice as many power strokes as a prior art cam shaft. FIG. 19 shows a single lobe 1920 on a cam shaft 1910. Because an air engine can produce twice as many power strokes, a dual-lobe cam shaft is preferred. FIG. 20 shows a cam shaft 2010 with two lobes 2020 and 2030. Lobe 2020 corresponds to the prior art lobe 1920 shown in FIG. 19. Lobe 2030 is a second lobe that is preferably directly opposite (180 degrees) from the first lobe 2020. In the most preferred implementation, each lobe on the cam shaft will have two lobes, as shown in FIG. 20. This is the reason the preferred cam shaft is a double-lobe cam shaft 210 as shown in FIG. 2. In one specific implementation, it may be possible to rework a prior art single-lobe cam shaft to add the additional lobes. In an alternative implementation, the double-lobe cam shaft may be manufactured as a new part.

The figures and specification discussed above support an apparatus comprising: a power source; an air compressor that provides a compressed air output; an air engine comprising: an engine block that includes a plurality of pistons in a plurality of cylinders that provide power to a drive shaft; a timing mechanism that controls the injection of air from the compressed air output into the cylinders in the engine block and controls exhaust of air out of the cylinders in the engine block, thereby producing power to the drive shaft; a motor mechanically coupled to the drive shaft and electrically coupled to the power source, wherein speed of the motor determines speed of the drive shaft; and an accelerator electrically coupled to the motor that controls speed of the motor.

The figures and specification discussed above support a method for controlling an air engine, the method comprising: providing a power source; providing an air compressor that provides a compressed air output; providing the air engine that comprises an engine block that includes a plurality of pistons in a plurality of cylinders that provide power to a drive shaft, the air engine performing the steps of: using a timing mechanism to control injection of the compressed air output of the air compressor into the cylinders in the engine block and controls exhaust of air out of the cylinders in the engine block, thereby producing power to the drive shaft; providing a motor mechanically coupled to the drive shaft and electrically coupled to the power source; engaging the motor to set the speed of the drive shaft of the air engine, wherein the turning of the air engine by engaging the motor causes the timing mechanism to provide the compressed air output from the air compressor to the cylinders in the engine block, thereby causing the air engine to run; and varying the speed of the motor to vary the speed of the air engine.

The figures and specification discussed above support an apparatus comprising: a power source comprising a plurality of direct current (DC) batteries; an air compressor that includes an air input and a compressed air output; an air engine comprising: an engine block that includes a plurality of pistons in a plurality of cylinders that provide power to a drive shaft; a timing mechanism that controls the injection of air from the compressed air output into the cylinders in the engine block and controls exhaust of air out of the cylinders in the engine block, thereby producing power to the drive shaft, wherein the timing mechanism comprises at least one head comprising: a plurality of intake valves that each injects the compressed air output from the air compressor into one of the plurality of cylinders in the engine block; a plurality of exhaust valves that each exhausts air from one of the plurality of cylinders in the engine block, where the exhaust air is fed back to the air input of the air compressor; and a dual-lobe cam shaft that controls opening and closing of the plurality of intake valves and the plurality of exhaust valves, wherein the dual-lobe cam shaft comprises a first plurality of lobes directly opposite a second plurality of lobes; a motor mechanically coupled to the drive shaft and electrically coupled to the power source, wherein speed of the motor determines speed of the drive shaft; a speed controller electrically coupled to the motor; and an accelerator electrically coupled to the speed controller that determines speed of the motor, wherein varying the speed of the accelerator varies the speed of the motor.

Because the air engine system disclosed herein is so much more efficient than internal combustion engines, a small internal combustion engine could be provided to charge the batteries to extend the range of a vehicle. Note, however, the size of the internal combustion engine needed to charge the batteries is significantly smaller than the size of an internal combustion engine that normally powers the vehicle. Thus, it is expected that a large diesel engine that is used in commercial over-the-road truck tractors could be converted to run on compressed air as described above, and the addition of a small diesel engine to charge the batteries would then provide the range needed to run the truck for a suitable distance, while still providing significant fuel savings.

Another advantage of the air engine system is the lack of combustion, which means the life of the air engine should be significantly higher than for a similar internal combustion engine. The operating temperature of the air engine will be much less because there is no combustion to soil the oil.

While the discussion herein is in terms of an air engine, an air compressor, an air tank, etc., one skilled in the art will readily appreciate that any suitable gas could be used. The term "air" in the disclosure and claims herein expressly extend to any suitable gas that may be compressed, including without limitation air, nitrogen, oxygen, or other gasses or combinations of gasses. Air is the preferred compressed gas because it is plentiful and free.

While the specific examples discussed above are for piston engines, the disclosure and claims herein extend to any suitable type of engine, whether currently known or developed in the future. The air engine disclosed and claimed herein can include any suitable means for converting air pressure to energy to drive a drive shaft. In addition, while traditional internal combustion engines provide rotational energy in the form of a rotational crank shaft that drives a drive shaft, the air engine disclosed and claimed herein can also include other forms of mechanical work, including linear or elliptical movement.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
a power source;
an air compressor that provides a compressed air output;
an air engine comprising:
an engine block that includes a plurality of pistons in a plurality of cylinders that provide power to a drive shaft;
a timing mechanism that controls the injection of air from the compressed air output into the cylinders in the engine block and controls exhaust of air out of the cylinders in the engine block, thereby producing power to the drive shaft;
a motor mechanically coupled to the drive shaft and electrically coupled to the power source, wherein speed of the motor determines speed of the drive shaft; and
an accelerator electrically coupled to the motor that controls speed of the motor.

2. The apparatus of claim 1 wherein the power source comprises a plurality of direct current (DC) batteries.

3. The apparatus of claim 1 wherein the timing mechanism comprises at least one head comprising:
a plurality of intake valves that each injects the compressed air output from the air compressor into one of the plurality of cylinders in the engine block;
a plurality of exhaust valves that each exhausts air from one of the plurality of cylinders in the engine block, and
a cam shaft that controls opening and closing of the plurality of intake valves and the plurality of exhaust valves.

4. The apparatus of claim 3 wherein the cam shaft comprises a dual-lobe cam shaft that includes a first plurality of lobes directly opposite a second plurality of lobes.

5. The apparatus of claim 1 wherein the air compressor includes an electrical air compression mechanism that is powered by the power source.

6. The apparatus of claim 1 wherein the air compressor includes a mechanical air compression mechanism that is powered by the drive shaft.

7. The apparatus of claim 1 wherein the apparatus comprises a vehicle.

8. The apparatus of claim 1 wherein the apparatus comprises an electrical generator.

9. The apparatus of claim 1 wherein exhaust air from the air engine is fed back into an air input on the air compressor.

10. The apparatus of claim 1 wherein the exhaust air from the air engine turns a turbocharger that provides air to an air input of the air compressor.

11. A method for controlling an air engine, the method comprising:
providing a power source;
providing an air compressor that provides a compressed air output;
providing the air engine that comprises an engine block that includes a plurality of pistons in a plurality of cylinders that provide power to a drive shaft, the air engine performing the steps of:
using a timing mechanism to control injection of the compressed air output of the air compressor into the cylinders in the engine block and controls exhaust of air out of the cylinders in the engine block, thereby producing power to the drive shaft;
providing a motor mechanically coupled to the drive shaft and electrically coupled to the power source;
engaging the motor to set the speed of the drive shaft of the air engine, wherein the turning of the air engine by engaging the motor causes the timing mechanism to provide the compressed air output from the air compressor to the cylinders in the engine block, thereby causing the air engine to run; and
varying the speed of the motor to vary the speed of the air engine.

12. The method of claim 11 further comprising:
providing a speed controller electrically coupled to the motor;
providing an accelerator electrically coupled to the speed controller that determines speed of the motor;
wherein the step of varying the speed of the motor comprises varying the accelerator.

13. The method of claim 11 wherein the power source comprises a plurality of direct current (DC) batteries.

14. The method of claim 11 wherein the timing mechanism comprises at least one head comprising:
a plurality of intake valves that each injects the compressed air output from the air compressor into one of the plurality of cylinders in the engine block;

a plurality of exhaust valves that each exhausts air from one of the plurality of cylinders in the engine block, and a cam shaft that controls opening and closing of the plurality of intake valves and the plurality of exhaust valves.

15. The method of claim 14 wherein the cam shaft comprises a dual-lobe cam shaft that includes a first plurality of lobes directly opposite a second plurality of lobes.

16. The method of claim 11 wherein the air compressor includes an electrical air compression mechanism that is powered by the power source.

17. The method of claim 11 wherein the air compressor includes a mechanical air compression mechanism that is powered by the drive shaft.

18. The method of claim 11 further comprising feeding back exhaust air from the air engine into an air input on the air compressor.

19. The method of claim 11 further comprising turning a turbocharger using air exhausted from the air engine, the turbocharger providing air to an air input of the air compressor.

20. An apparatus comprising:
a power source comprising a plurality of direct current (DC) batteries;
an air compressor that includes an air input and a compressed air output;
an air engine comprising:
an engine block that includes a plurality of pistons in a plurality of cylinders that provide power to a drive shaft;
a timing mechanism that controls the injection of air from the compressed air output into the cylinders in the engine block and controls exhaust of air out of the cylinders in the engine block, thereby producing power to the drive shaft, wherein the timing mechanism comprises at least one head comprising:
a plurality of intake valves that each injects the compressed air output from the air compressor into one of the plurality of cylinders in the engine block;
a plurality of exhaust valves that each exhausts air from one of the plurality of cylinders in the engine block, where the exhaust air is fed back to the air input of the air compressor; and
a dual-lobe cam shaft that controls opening and closing of the plurality of intake valves and the plurality of exhaust valves, wherein the dual-lobe cam shaft comprises a first plurality of lobes directly opposite a second plurality of lobes;
a motor mechanically coupled to the drive shaft and electrically coupled to the power source, wherein speed of the motor determines speed of the drive shaft;
a speed controller electrically coupled to the motor; and
an accelerator electrically coupled to the speed controller that determines speed of the motor, wherein varying the speed of the accelerator varies the speed of the motor.

* * * * *